UNITED STATES PATENT OFFICE

1,966,947
NONCAKING MIXED FERTILIZER

Carl Eyer, Ludwigshafen-on-the-Rhine, Gottwald Baetz, Oggersheim, and August Herterich, Gerthe, Germany, assignors to I. G. Farbenindustrie Aktiengesellschaft, Frankfort-on-the-Main, Germany No Drawing. Application October 19, 1931, Serial No. 569,834. In Germany October 20, 1930

9 Claims. (Cl. 71—9)

The present invention relates to non-caking mixed fertilizers containing ammonium nitrate and a process for their production.

Ammonium nitrate and many mixed fertilizers containing ammonium nitrate have the objectionable property of hardening more or less rapidly and strongly when stored, thereby losing their capacity for being scattered. In order to obviate this objection it has already been proposed to add to the mixed fertilizers small amounts of salts capable of combining with water of crystallization as for example magnesium salts or sodium salts; these additional substances certainly prevent the hardening of the salts to a certain extent when stored, but they have the objection that they increase the hygroscopicity of the salts to a greater or less extent.

We have now found that fertilizers having a substantially better capacity for storage than the products obtained with the said additional substances are obtained by adding to or incorporating with the mixed fertilizers containing ammonium nitrate salts of aluminium or of iron which in the anhydrous state have the property of being capable of taking up water as water of crystallization. The salts of iron or aluminium which are capable of taking up water as water of crystallization need not be added as such, but may also be formed by the interaction of an iron or aluminium compound with a component of the mixed fertilizer. It is preferable to select sulphates as the additional substances because these have a particularly strong capacity for combining with water. In the presence of ammonium sulphate the said metal salts form double salts; thus aluminium ammonium alum or iron ammonium alum is formed when aluminium sulphate or ferric sulphate respectively are used in the presence of ammonium sulphate, and ferrous ammonium sulphate (Mohr's salt) is formed when ferrous sulphate is used. These double salts may also be added to the fertilizers from the start instead of the single sulphates and other double salts containing aluminium or iron, as for example potassium aluminium sulphate $(KAl(SO_4)_2)$ or sodium iron sulphate $(NaFe(SO_4)_2)$ or sodium aluminium sulphate exert a similar action. Such sulphates may also be formed in the mixed fertilizers by the interaction of sulphates for example those of ammonium, potassium, sodium, divalent iron, zinc or manganese, with the chlorides or nitrates of aluminium or iron or also with the liquid rich in ferric hydroxide hydrosol which is obtained by adding to ferrous sulphate containing water of crystallization an amount of nitric acid which is insufficient for the complete conversion into ferric salts.

It is not necessary to employ the additional salts in a completely or partially dehydrated state, but good results are also obtained by the employment of the completely hydrated salts, provided a drying operation is applied after the addition of the iron or aluminium salts.

It is immaterial at which stage of the process or in which form the said salts are added; for example they may be added in a dissolved or solid form to the dissolved or fused fertilizers or mixed in the wholly or partly dehydrated form with the finished fertilizers. The additional salts may also be sprayed onto the fertilizers in the form of concentrated solutions. In this case the sprayed product is subjected to a subsequent treatment by drying at elevated temperature.

The iron or aluminium salts used according to the present invention prevent hardening of the mixed fertilizers much more efficiently than other salts which have previously been suggested for this purpose, as for example magnesium salts. This is evident from a series of comparative tests in which samples of ammonium sulphate nitrate with different additions were examined for the same time under exactly the same conditions as regards temperature, atmospheric moisture and pressure load. Thereby the samples hardened to some extent so that a certain pressure was necessary to break down the hardened masses. This breaking pressure is a direct measure for the degree of hardening, the pressure being the higher the more the mass had hardened during storage. The results of such comparative experiments are given in the following table, the breaking pressure of the sample with magnesium sulphate being calculated as 100 relative units.

| Added substance | Amount added | Relative breaking pressure |
|---|---|---|
| | Percent | |
| $MgSO_4.7H_2O$ | 4 | 100 |
| $Mg(NO_3)_2.6H_2O$ | 4 | 146 |
| $AlCl_3$ | 4 | 44 |
| NaAl borate | 4 | 28 |
| $KCl.AlCl_3$ | 4 | 24 |
| $NaAl(SO_4)_2.12H_2O$ | 4 | 23 |
| $Al(NO_3)_3.9H_2O$ | 4 | 18 |
| $Al_2(SO_4)_3.18H_2O$ | 4 | 16 |
| $NH_4Al(SO_4)_2.12H_2O$ | 4 | 15 |
| $KAl(SO_4)_2.12H_2O$ | 4 | 14 |
| Ferric citrate | 4 | 13 |
| $Fe_2(SO_4)_3.4.5H_2O$ | 4 | 7 |
| Mohr's salt | 5.4 | 6 |
| $6FeSO_4.Fe_2(SO_4)_3.10H_2O$ | 4 | 6 |
| $FeSO_4.7H_2O$ | 4 | 5 |
| $FeSO_4.Fe_2(SO_4)_3.2H_2SO_4$ | 4 | 4 |
| $FeCl_2.6H_2O$ | 4 | 4 |
| $Fe(NO_3)_3.9H_2O$ | 4 | 4 |
| $NH_4Fe(SO_4)_2.12H_2O$ | 4 | 4 |

The amounts of iron or aluminium salts added according to the present invention need not be very great. They vary as a rule between 1 and 10 per cent, and preferably between 3 and 6 per cent, by weight of the dry mixed fertilizers.

The following examples will further illustrate how this invention may be carried out in practice, but the invention is not restricted to these examples. The parts are by weight.

*Example 1*

45 kilograms of wholly or partly dehydrated pulverized aluminium sulphate are introduced while stirring well, into 720 kilograms of a hot ammonium nitrate melt of about 96 per cent strength. 1000 kilograms of ammonium sulphate are added to this mixture in an endless screw, whereby the mass solidifies rapidly. The aluminium sulphate may also be mixed with a part of the necessary ammonium sulphate, the mixture introduced into the ammonium nitrate melt and the remainder of the ammonium sulphate then added.

In both cases a product having only a slight hygroscopicity and an excellent capacity for storage is obtained.

*Example 2*

60 kilograms of ferrous sulphate ($FeSO_4.7H_2O$) in the form of a very concentrated solution and 1000 kilograms of ammonium sulphate are added to 750 kilograms of a hot ammonium nitrate melt of about 92 per cent strength in an endless screw. The mixing of the ferrous sulphate with the hot ammonium nitrate alone should be avoided, since decomposition of the ammonium nitrate might take place. The product is subsequently dried and comminuted. Instead of ferrous sulphate, ferrous ammonium sulphate or ferric sulphate may be employed.

The ferrous sulphate may also first be mixed in the solid form with a part of the ammonium sulphate, this mixture introduced into the ammonium nitrate melt and the remainder of the ammonium sulphate then added.

*Example 3*

A concentrated ferric nitrate solution is prepared by dissolving iron scraps in nitric acid. Ammonium nitrate is added in such an amount to the solution, filtered if necessary, that there are 700 kilograms of ammonium nitrate to each 20 to 30 kilograms of anhydrous ferric nitrate. The resulting mixture is worked up into ammonium sulphate nitrate with 1000 kilograms of ammonium sulphate. The resulting product is dried at about 100° C.

*Example 4*

1000 kilograms of ammonium sulphate nitrate are mixed with from 30 to 40 kilograms of partly or wholly dehydrated sodium aluminium sulphate ($NaAl(SO_4)_2$). In order to ensure a uniform and intimate mixing, the alum is employed in a very finely divided form. This product also has a good capacity for storage.

*Example 5*

A hot saturated solution of magnesium aluminium sulphate (($MgAl)_2(SO_4)_5$) is sprayed in the form of a fine mist by means of a nozzle onto dry ammonium sulphate nitrate or another mixed fertilizer containing ammonium nitrate, preferably while the fertilizer is still hot so that the water contained in the concentrated solution is to a great extent evaporated. It is advantageous to remove any water still remaining, as for example in a drying drum at about 100° C.

*Example 6*

67 parts of commercial ferric chloride are introduced into 1000 parts of an ammonium nitrate melt of 97 per cent strength. After the ferric chloride has been dissolved, the mass is mixed with a mixture of 1100 parts of crude potassium chloride containing 80 per cent of KCl and 75 parts of ammonium sulphate. The mixture is then allowed to cool while being comminuted.

*Example 7*

1000 kilograms of commercial ferrous sulphate are mixed with 480 kilograms of ammonium sulphate and 610 kilograms of nitric acid of 50 per cent strength are added. Nitric oxide is evolved and a solution of ferric ammonium alum and ammonium nitrate is obtained, which is evaporated until it has a syrupy consistency. 4 parts of this concentrated solution are added to 45 parts of an ammonium nitrate melt of 97 per cent strength and then 51 parts of ammonium sulphate are introduced while mixing well, whereupon the mass is allowed to cool.

Instead of the aforesaid concentrated iron solution, use may be made of the liquid which is obtained by the action of 150 kilograms of nitric acid of 62 per cent strength on 1000 kilograms of ferrous sulphate $FeSO_4.7H_2O$.

What we claim is:—

1. As a new article of manufacture, mixed fertilizers comprising ammonium nitrate, containing a sulphate of a metal selected from the group consisting of aluminium and iron, said sulphate being capable of taking up water as water of crystallization, said mixed fertilizers being substantially as readily soluble in water as the same mixed fertilizers when free from said salt capable of taking up water.

2. As a new article of manufacture, mixed fertilizers comprising ammonium nitrate, containing a double sulphate of a metal selected from the group consisting of aluminium and iron, said sulphate being capable of taking up water as water of crystallization, said mixed fertilizers being substantially as readily soluble in water as the same mixed fertilizers when free from said salt capable of taking up water.

3. As a new article of manufacture, ammonium sulphate nitrate, containing a sulphate of a metal selected from the group consisting of aluminium and iron, said sulphate being capable of taking up water as water of crystallization, said product being substantially as readily soluble in water as ammonium sulphate nitrate itself.

4. As a new article of manufacture, ammonium sulphate nitrate, containing an iron sulphate capable of taking up water as water of crystallization, said product being substantially as readily soluble in water as ammonium sulphate nitrate itself.

5. As a new article of manufacture, ammonium sulphate nitrate, containing an iron double sulphate capable of taking up water as water of crystallization, said product being substantially as readily soluble in water as ammonium sulphate nitrate itself.

6. As a new article of manufacture, mixed fertilizers comprising ammonium nitrate, containing a salt of a metal selected from the group consisting of aluminium and iron, said salt being capable of taking up water as water of crystallization, said mixed fertilizers being substantially as readily soluble in water as the same mixed fertilizers when free from said salt capable of taking up water.

7. As a new article of manufacture, mixed fertilizers comprising ammonium nitrate, containing between 1 and 10 per cent by weight, of a salt of a metal selected from the group consisting of aluminium and iron, said salt being capable of taking up water as water of crystallization, said mixed fertilizers being substantially as readily soluble in water as the same mixed fertilizers when free from said salt capable of taking up water.

8. As a new article of manufacture, mixed fertilizers comprising ammonium nitrate, containing between 3 and 6 per cent by weight, of a salt of a metal selected from the group consisting of aluminium and iron, said salt being capable of taking up water as water of crystallization, said mixed fertilizers being substantially as readily soluble in water as the same mixed fertilizers when free from said salt capable of taking up water.

9. As a new article of manufacture, ammonium sulphate nitrate, containing a salt of a metal selected from the group consisting of aluminium and iron, said salt being capable of taking up water as water of crystallization, said product being substantially as readily soluble in water as ammonium sulphate nitrate itself.

CARL EYER.
GOTTWALD BAETZ.
AUGUST HERTERICH.